US012548016B1

United States Patent
Atallah et al.

(10) Patent No.: US 12,548,016 B1
(45) Date of Patent: Feb. 10, 2026

(54) MINTING AND MANAGEMENT OF ITEMS ON A BLOCKCHAIN

(71) Applicant: Ozone Networks, Inc., New York, NY (US)

(72) Inventors: Alexander Atallah, New York, NY (US); Robert W. Sun, Santa Clara, CA (US)

(73) Assignee: OZONE NETWORKS, INC., New York, NY (US)

( * ) Notice: Subject to any disclaimer, the term of this patent is extended or adjusted under 35 U.S.C. 154(b) by 0 days.

(21) Appl. No.: 18/185,959

(22) Filed: Mar. 17, 2023

Related U.S. Application Data

(60) Provisional application No. 63/321,463, filed on Mar. 18, 2022.

(51) Int. Cl.
*G06Q 20/38* (2012.01)
*G06Q 20/40* (2012.01)

(52) U.S. Cl.
CPC ......... *G06Q 20/389* (2013.01); *G06Q 20/401* (2013.01)

(58) Field of Classification Search
CPC ........................... G06Q 20/389; G06Q 20/401
USPC ...................................................... 705/35–45
See application file for complete search history.

(56) References Cited

U.S. PATENT DOCUMENTS

| | | | | |
|---|---|---|---|---|
| 2023/0281604 A1* | 9/2023 | Robell | ................ | G06Q 30/018 |
| 2023/0298001 A1* | 9/2023 | Jethmalani | ........... | G06Q 20/065 |
| | | | | 705/65 |
| 2023/0376938 A1* | 11/2023 | Frix | .................. | G06Q 30/0278 |
| 2023/0410104 A1* | 12/2023 | Towles | ................ | G06Q 20/389 |
| 2023/0419283 A1* | 12/2023 | Le | .......................... | G06Q 30/04 |
| 2024/0005320 A1* | 1/2024 | Pardo | ........................ | H04L 9/50 |

OTHER PUBLICATIONS

Alex Atallah, "Create NFTs for Free on OpenSea," OpenSea Blog, dated: Dec. 29, 2020, pp. 1-6.

* cited by examiner

*Primary Examiner* — Robert R Niquette
(74) *Attorney, Agent, or Firm* — Alston & Bird LLP

(57) ABSTRACT

Techniques for minting and management of items on a blockchain are disclosed. These techniques include minting a limited fungibility token relating to a digital item, including creating the token using a smart contract associated with a blockchain, and recording the token in a storage repository without recording the token in the blockchain. The techniques further include receiving a request to transfer the token from a first entity to a second entity, validating the request to transfer based on a query to the smart contract, and adding the token to the blockchain, based on the validating the request to transfer.

15 Claims, 10 Drawing Sheets

MINTING AND MANAGEMENT OF ITEMS ON A BLOCKCHAIN

CROSS-REFERENCE TO RELATED APPLICATIONS

This application claims the benefit of and priority to U.S. Provisional Patent Application No. 63/321,463, filed Mar. 18, 2022, the entire contents of which are incorporated herein by reference.

INTRODUCTION

Blockchain based currencies continue to increase in popularity, and are becoming more and more widespread. In addition to currencies, blockchain technology can be used to manage non-fungible tokens (NFTs). In an embodiment, NFTs can be unique, digital items with blockchain-managed ownership. Examples include collectibles, game items, digital art, event tickets, domain names, and ownership records for physical items. These are merely examples, and NFTs can be used in a wide variety of applications.

NFTs can be purchased, sold, or exchanged, in digital marketplaces. These digital marketplaces can, for example, list available NFTs for sale, and allow purchasers to identify desired NFTs and purchase the NFTs (e.g., through an auction process or a direct sale). For example, an NFT creator can mint an NFT (e.g., create the NFT as a digital item on a blockchain). The NFT creator, or another seller, can list the NFT for sale, at a particular price (e.g., using a suitable cryptocurrency). A purchaser can find the NFT and purchase the NFT. In an embodiment, this transfers ownership of the token from the seller to the purchaser (e.g., using a smart contract), as recorded on a blockchain.

DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Overview

Figure 1:
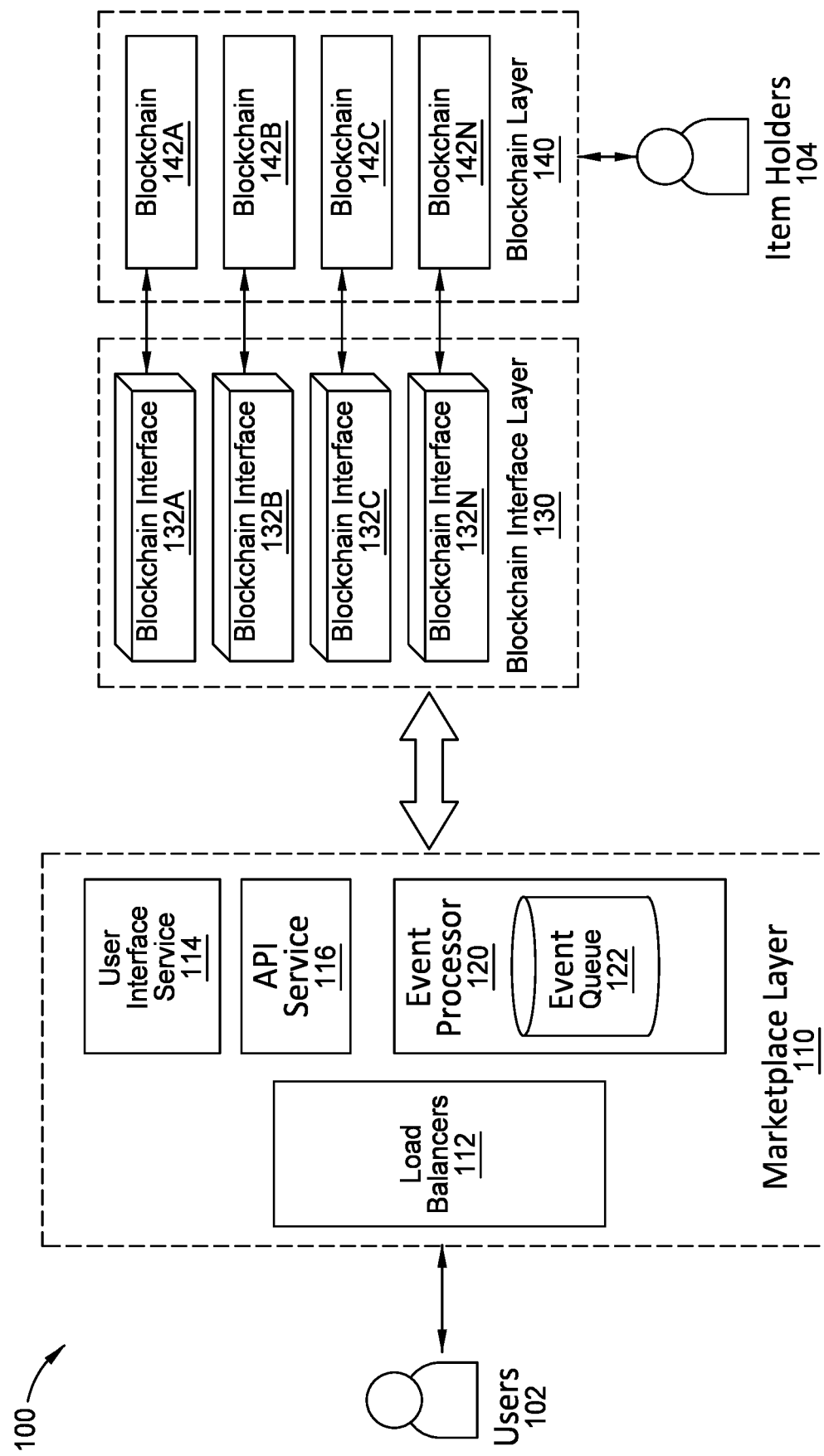
FIG. 1 depicts a computing environment for an NFT marketplace, according to one embodiment.

Embodiments include a method. The method includes minting a limited fungibility token relating to a digital item, including creating the token using a smart contract associated with a blockchain, and recording the token in a storage repository without recording the token in the blockchain. The method further includes receiving a request to transfer the token from a first entity to a second entity. The method further includes validating the request to transfer, based on a query to the smart contract. The method further includes adding the token to the blockchain, based on the validating the request to transfer.

Embodiments further include a system, including a processor and a memory having instructions stored thereon which, when executed on the processor, performs operations. The operations include minting a limited fungibility token relating to a digital item, including creating the token using a smart contract associated with a blockchain and recording the token in a storage repository without recording the token in the blockchain. The operations further include receiving a request to transfer the token from a first entity to a second entity. The operations further include validating the request to transfer, based on a query to the smart contract. The operations further include adding the token to the blockchain, based on the validating the request to transfer.

Embodiments further include a non-transitory computer-readable medium having instructions stored thereon which, when executed by a processor, performs operations. The operations include minting a limited fungibility token relating to a digital item, including creating the token using a smart contract associated with a blockchain and recording the token in a storage repository without recording the token in the blockchain. The operations further include receiving a request to transfer the token from a first entity to a second entity. The operations further include validating the request to transfer, based on a query to the smart contract. The operations further include adding the token to the blockchain, based on the validating the request to transfer.

Example Embodiments

Aspects of the present disclosure provide apparatuses, methods, processing systems, and non-transitory computer-readable mediums for item (e.g., NFT) management, including off-chain creation of NFTs, freezing of metadata for NFTs, and migrating smart contracts for NFTs. As discussed above, in an embodiment NFTs can be unique, digital items with blockchain-managed ownership. Prior to NFTs, ownership of digital items was commonly context specific (e.g., within a particular digital platform only, like a game or particular software application). Blockchains can expand this ownership by providing a coordination layer for digital items, giving users ownership and management permission over their digital items. For example, blockchain standards ERC-20, ERC-721 and ERC-1151 can be used to manage ownership of NFTs in the Ethereum blockchain using smart contracts. As another example, the Inter-Blockchain Communication Protocol (IBC) can be used to facilitate transport between blockchains, and the Metaplex protocol can be used to manage NFTs in the Solana blockchain. These are merely examples, and a wide variety of blockchain standards, protocols, and implementations can be used to implement and manage NFTs. Further, in an embodiment, a wide variety of blockchains can be used to implement and manage NFTs (e.g., Ethereum, Polygon, Klatyn, Solana, and any other suitable blockchain).

There are many technical challenges for NFT marketplaces, including challenges related to minting NFTs. For example, minting NFTs on-chain (e.g., creating and recording NFTs on a blockchain) can create a significant computational burden on the blockchains, and can be computationally and monetarily expensive (e.g., due to gas fees). As discussed further below, one or more embodiments discussed herein address these problems by providing techniques for off-chain creation of NFTs (e.g., assigning a tokenID to the NFT metadata off-chain), and later on-chain minting (e.g., updating the blockchain) after the item is transferred from the creator to an acquirer. Further, NFT marketplaces face many other technical challenges, including ensuring continued validity of NFT metadata. One or more of the techniques disclosed herein address this problem, as well.

FIG. 1 depicts a computing environment 100 for an NFT marketplace, according to one embodiment. In an embodiment, one or more users 102 interact with an NFT marketplace using a marketplace layer 110. For example, the users 102 can include NFT acquirers (e.g., purchasers), NFT sellers, NFT originators, and any other suitable users of an NFT marketplace. The users 102 interact with the marketplace layer 110 using a suitable communication network and suitable computing devices (e.g., laptop computers, desktop computers, smartphones, tablet computers, smart watches and wearable devices, embedded devices, and any other suitable computing devices). For example, the users 102 can interact with the marketplace layer 110 using a local area network (LAN), a wide area network (WAN), the Internet, or any other suitable communication network. Further, the users 102 and marketplace layer 110 can be connected to the communication network using any suitable network connection, including a wired connection (e.g., an Ethernet or fiber optic connection), a wireless connection (e.g., a WiFi connection), a cellular connection, or any other suitable network connection.

In an embodiment, the marketplace layer 110 includes one or more load balancers 112 to manage connections with the users 102. For example, the marketplace layer 110 can be implemented using any suitable combination of physical compute systems, cloud compute nodes and storage locations, or any other suitable implementation. In this example, the load balancers 112 can manage connections between the users 102 and any compute nodes or compute systems used in the marketplace layer 110. For example, the marketplace layer 110 could be implemented using a server or cluster of servers, and the load balancers 112 can manage connections from the users 102 to the server or cluster of servers. As another example, the marketplace layer 110 can be implemented using a combination of compute nodes and storage locations in a suitable cloud environment, including a public cloud, a private cloud, a hybrid cloud, or any other suitable implementation.

The marketplace layer 110 further includes a user interface service 114. In an embodiment, the user interface service 114 facilitates providing a user interface for the users 102 to use the marketplace layer 110 (e.g., an NFT marketplace). For example, the user interface service 114 can provide a suitable web interface for the users 102 to access via a web browser, can facilitate a mobile application user interface (e.g., for a smartphone, tablet, wearable device, laptop computer, or desktop computer), or can facilitate any other suitable user interface.

The marketplace layer 110 further includes an application programming interface (API) service 116. In an embodiment, the API service 116 facilitates interactions with the marketplace layer 110 (e.g., with an NFT marketplace) using a suitable API. For example, users can interact with the marketplace layer 110 using the API service 116. The API service 116 can receive, and implement, these interactions (e.g., remote procedure calls).

The marketplace layer 110 further includes an event processor 120, which includes an event queue 122. In an embodiment, the marketplace layer 110 (e.g., an NFT marketplace) interacts with blockchains and NFTs using events. For example, the marketplace layer 110 can create an event for each NFT transaction, including a bid, purchase, sale, or any other suitable transaction. These events can be stored in the event queue 122, and processed using the event processor 120 (e.g., a software application, as described further below). The event queue 122 can be any suitable repository, including dynamic or persistent memory, and can store the events in any suitable manner.

In an embodiment, the marketplace layer 110 interacts with a blockchain layer 140 using a blockchain interface layer 130. For example, the marketplace layer 110 (e.g., a suitable software service in the marketplace layer 110) can interact with a block chain 142A by making a remote procedure call (RPC) to the blockchain interface 132A. In an embodiment, the marketplace layer 110 is managed by an NFT marketplace, and it interacts with independently operating blockchains in the blockchain layer 140 using the blockchain interface layer 130. The blockchain layer 140 includes any number of suitable blockchains 142A-N (e.g., Ethereum, Polygon, Klatyn, Solana, and any other suitable blockchain) and the blockchain interface layer 130 includes any number of blockchain interfaces 132A-N. In an embodiment, the marketplace layer 110 uses each blockchain interface 132A-N to interact with a particular blockchain. For example, the blockchain 142A could be the Ethereum blockchain, and the marketplace layer 110 can use the blockchain interface 132A to interact with the Ethereum blockchain. This is merely an example, and one or more of the blockchain interfaces 132A-N could be used to interact with multiple blockchains, or multiple of the blockchain interfaces 132A-N could be used to interact with as single blockchain.

In an embodiment, one or more item holders 104 maintain items (e.g., NFTs) on one or more of the blockchains 142A-N in the blockchain layer 140. For example, the item holders 104 can include NFT creators or NFT purchasers who hold NFTs through one of the blockchains 142A-N.

Figure 2:
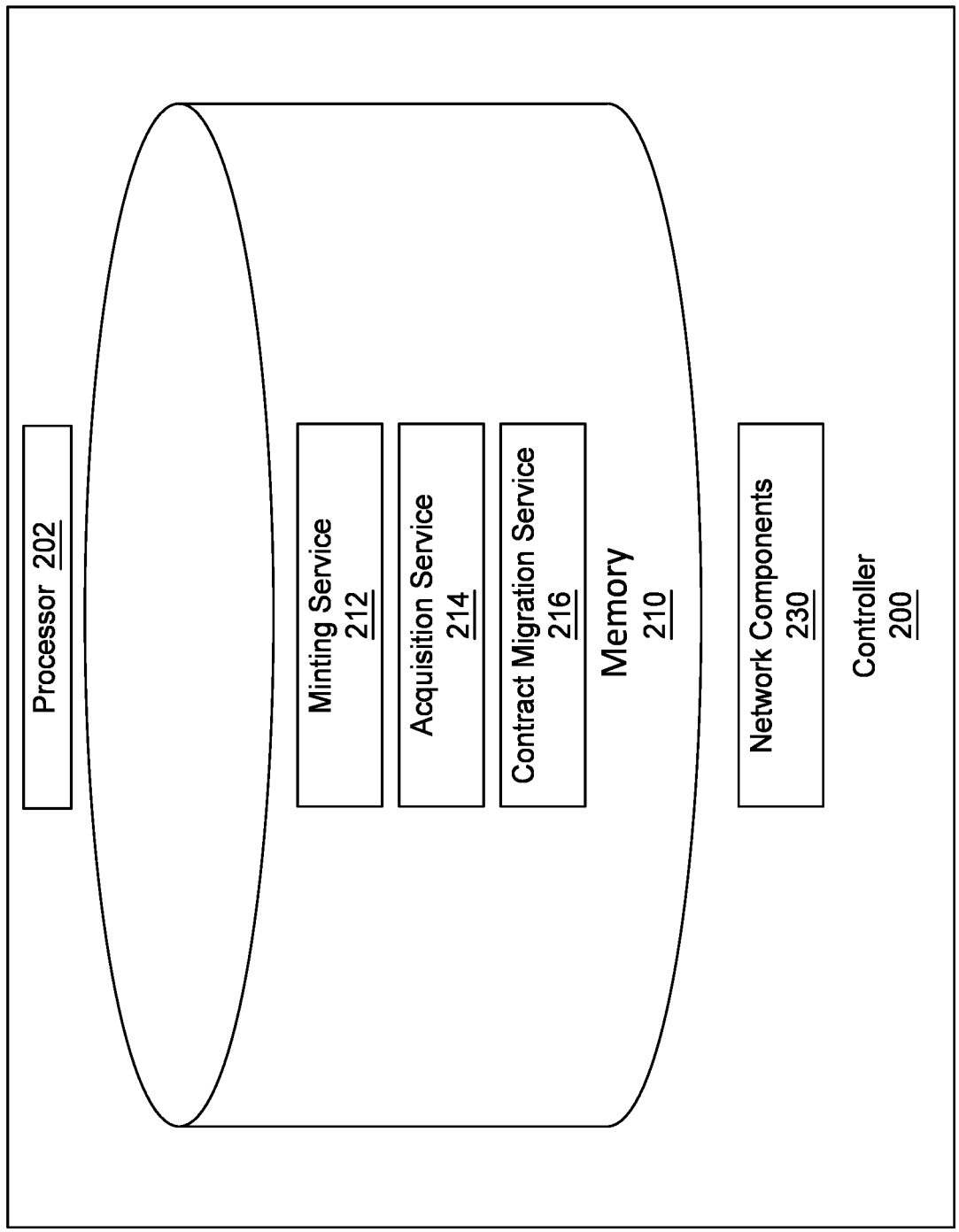
FIG. 2 depicts a block diagram for a controller for an NFT marketplace, according to one embodiment.

FIG. 2 depicts a block diagram for a controller 200 for an NFT marketplace, according to one embodiment. In an embodiment, the controller 200 corresponds with one or more aspects of the marketplace layer 110 illustrated in FIG. 1. The controller 200 includes a processor 202, a memory 210, and network components 230. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 230 include the components necessary for the controller 200 to interface with a suitable communication network (e.g., a communication network interconnecting various components of the computing environment 100 illustrated in FIG. 1, or interconnecting the computing environment 100 with other computing systems). For example, the network components 230 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the controller 200. The program code is generally described as various functional "applications" or "modules" within the memory 210, although alternate implementations may have different functions and/or combinations of functions. Within the memory 210, the minting service 212 facilitates minting (e.g., off-chain creation and later on-chain minting) of new items (e.g., new NFTs). This is discussed further below with regard to FIGS. 3-6B. The minting service also facilitates freezing metadata for items (e.g., NFTs). This is discussed further below with regard to FIG. 7. The acquisition service 214 facilitates acquiring items that have been created off-chain. This is discussed further below with regard to FIGS. 3-6B. The contract migration service 216 facilitates migrating items from an existing smart contract to a new smart contract. This is discussed further below with regard to FIG. 8.

As discussed above in relation to the marketplace layer 110 illustrated in FIG. 1, while the controller 200 is illustrated as a single entity, in an embodiment, the various components can be implemented using any suitable combination of physical compute systems, cloud compute nodes and storage locations, or any other suitable implementation. For example, the controller 200 could be implemented using a server or cluster of servers. As another example, the controller 200 can be implemented using a combination of compute nodes and storage locations in a suitable cloud environment. For example, one or more of the components of the controller 200 can be implemented using a public cloud, a private cloud, a hybrid cloud, or any other suitable implementation.

Although FIG. 2 depicts the services 212, 214, and 216 as being mutually co-located in memory 210, that representation is also merely provided as an illustration for clarity. More generally, the controller 200 may include one or more computing platforms, such as computer servers for example, which may be co-located, or may form an interactively linked but distributed system, such as a cloud-based system. As a result, processor 202 and memory 210 may correspond to distributed processor and memory resources within the computing environment 100. Thus, it is to be understood that any, or all, of the services 212, 214, and 216 may be stored remotely from one another within the distributed memory resources of the computing environment 100.

Off-Chain Creation

Figure 3:
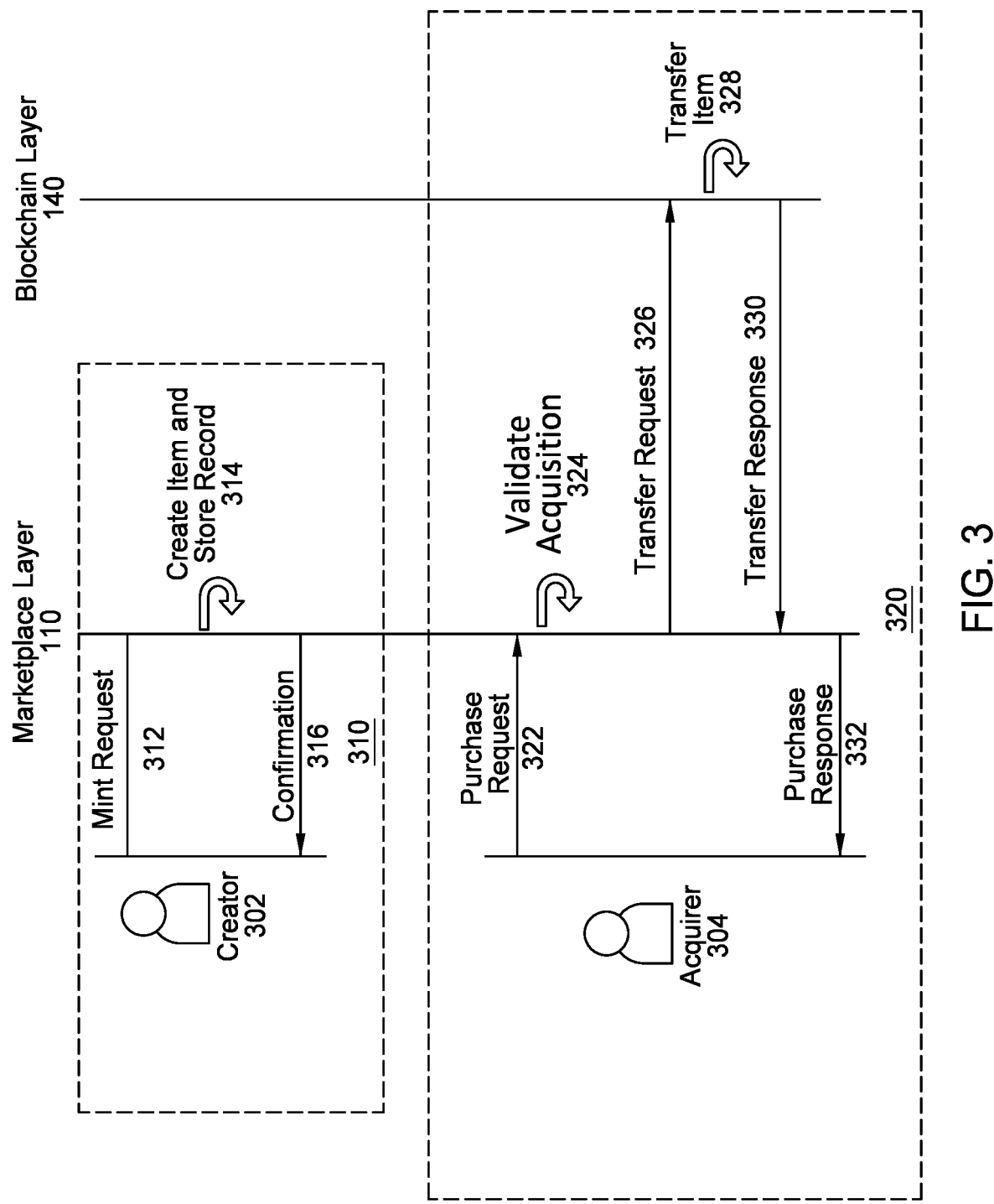
FIG. 3 illustrates a first technique for off-chain creation of items in a blockchain, according to one embodiment.

FIG. 3 illustrates a first technique for off-chain creation of items (e.g., NFTs) in a blockchain, according to one embodiment. In an embodiment, an item is typically added directly to a blockchain during minting. This typically requires transaction fees (e.g., gas fees for the Ethereum blockchain). Gas fees are the fluctuating price that miners for the Ethereum blockchain charge to write new data on the blockchain. Existing solutions require adding an item to the blockchain when it is minted (e.g., by updating the state of a smart contract), and so a creator (or some other entity) must pay a gas fee when the item is minted and added to the blockchain. Further, recording the minting on the blockchain uses compute resources, which requires power and places a burden on the blockchain.

One or more techniques described herein can be used to securely create items off-chain, without adding the items to the blockchain until (and unless) they are transferred from the creator to an acquirer. For the example, as discussed below in relation to FIGS. 3-6B, an item can be created (e.g., a tokenID can be assigned to the item's metadata) and initially recorded by an NFT marketplace. The item can be added to the blockchain only when it is first transferred from the creator to another entity (e.g., an acquirer).

One or more of these new techniques provides a significant technical improvement over prior techniques. First, as discussed above, in prior art solutions an item (e.g., an NFT) is added to the blockchain as it is minted (e.g., using a smart contract). Blockchain transactions are often computationally expensive, so this wastes compute resources and power. By waiting to record the item on the blockchain until the item is transferred from the creator to another entity, one or more techniques described herein avoid wasting compute resources and power needed to add the item to the blockchain (e.g., until the item is transferred from the creator to an acquirer). Further, because some items are never transferred away from the creator (e.g., never sold or transferred), waiting to record these items on the blockchain until they are transferred away from the creator results in the items never being added to the blockchain, leading to a significant savings in compute resources and power used by the blockchain.

Second, as discussed below, one or more techniques described herein guarantee the non-fungibility (or limited fungibility) of items while saving in compute resources and power. For example, a tokenID can be generated for the item with creator and supply information embedded in the tokenID. This tokenID can be used to ensure non-fungibility (or limited fungibility) for the associated item, before the item is added to the blockchain. This is discussed further, below, with regard to FIGS. 3-4B. As another example, a smart contract with a defined limited supply and initial ownership can be used to guarantee non-fungibility for the associated item, before the item is added to the blockchain. This is discussed further, below, with regard to FIGS. 5-6B. Use of a smart contract to guarantee non-fungibility, as an alternative or in addition to use of a tokenID, can provide further advantages. For example, a smart contract guaranteeing fungibility could be used across multiple NFT marketplaces regardless of tokenID implementation, greatly increasing flexibility and interoperability. Further, a smart contract can be used to transparently allow buyers to query the available supply for an item before the item is added to the blockchain, without requiring knowledge of the tokenID implementation. In sum, one or more of the techniques discussed below with regard to FIGS. 3-6B can be used to guarantee the supply of the item, while allowing the item to be created off-chain to reduce computational resource usage and reduce wasted power.

Returning to FIG. 3, in an embodiment a creator 302 creates an item as part of an off-chain creation process 310. The creator 302 sends a mint request 312 to the marketplace layer 110. For example, the mint request 312 can identify a digital object for the item (e.g., an image file, a video file, a text file, an audio file, an object model file (e.g., a three-dimensional model of an object), or any other suitable digital object).

In an embodiment, the mint request 312 can include the digital object itself. Alternatively, or in addition, the mint request 312 can identify a storage location for the object (e.g., a suitable repository at which the object is stored). The mint request 312 can further include data describing the item (e.g., a name, description, description uniform resource locator (URL) link, or any other suitable data), properties for the item (e.g., a collection for the item, properties of the item, levels or statistics for the item, or any other suitable properties), a supply for the item (e.g., a maximum supply of tokens that may be created for the item), and a blockchain for the item. These are merely examples, and the mint request 312 can include any suitable combination of this data or any other suitable data.

At 314, a minting service (e.g., the minting service 212 illustrated in FIG. 2) creates an item and stores a record of the item (e.g., a record of an associated tokenID). As discussed above, in an embodiment an item (e.g., an NFT) can be created without immediately storing the item on the blockchain (e.g., without immediately updating the state of an associated smart contract). For example, a specific tokenID can be created for the item and assigned to the item metadata. The tokenID can encode the creator and maximum supply (or any other suitable information) for the item. A token with the generated tokenID can then be stored in the marketplace layer 110, or at any other suitable location, until it is transferred from the creator 302 to an acquirer 304. The item can be recorded on the blockchain only when it is transferred from the creator 302 to the acquirer 304. This is discussed further below, with regard to FIG. 4A.

In an embodiment, the minting service then sends a confirmation 316 to the creator 302. For example, the confirmation can confirm that the item was created successfully and can identify the created item (e.g., using a tokenID). These are merely examples, and the confirmation 316 can include any suitable information.

In an embodiment, the item is created off-chain using the marketplace layer 110. This is merely an example. One or more of these techniques can be used outside of an NFT marketplace. For example, an item creator can directly create the item off chain with a suitable tokenID, or the item can be created in any other suitable environment.

In an embodiment, an acquirer 304 acquires an item using an acquisition process 320. For example, the acquirer can identify an item for sale using an NFT marketplace, and can use the item marketplace (e.g., using the marketplace layer 110) to acquire the item. In an embodiment, the acquirer 304 sends a purchase request 322 to the marketplace layer 110 (e.g., a request to purchase the item from the creator 302). For example, the purchase request 322 can identify an item that the acquirer 304 wishes to purchase, and can identify a wallet as a source for funds to purchase the item (e.g., a MetaMask wallet, a Coinbase wallet, a TrustWallet, a Portis wallet, a Fortmatic/Magic wallet, a Venly wallet, an Authereum wallet, a Bitski wallet, a Dapper wallet, a Kaikas wallet, an OperaTouch wallet, a Torus wallet, a WalletConnect wallet, a WalletLink wallet, or any other suitable wallet). These are merely examples, and the purchase request 322 can include any suitable information.

At 324, an acquisition service (e.g., the acquisition service 214 illustrated in FIG. 2) validates the acquisition. For example, the acquisition service can use the tokenID for the item to identify the creator and supply for the item, and to verify that the item has not yet been added to the blockchain and has not been transferred from the creator 302 to another entity. This is discussed further below with regard to FIG. 4B.

Assuming the acquisition service successfully validates the record for the requested NFT, the acquisition service sends a transfer request 326 to a blockchain layer 140 (e.g., the blockchain layer 140 illustrated in FIG. 1). As discussed below with regard to FIG. 4B, in an embodiment the transfer request 326 requests a transfer from the creator 302 (e.g., the wallet of the creator 302) to the acquirer 304 (e.g., the wallet of the acquirer 304). For example, the acquisition service can call a suitable function in a smart contract to transfer the item from the creator to the acquirer.

At 328, the blockchain layer 140 transfers the item from the creator 302 (e.g., the wallet of the creator 302) to the acquirer 304 (e.g., the wallet of the acquirer 304). For example, the smart contract executes the desired function and transfers the item. The blockchain layer 140 can relate to any suitable blockchain, and can transfer the item using any suitable technique for the relevant blockchain. In an embodiment the blockchain layer 140 then sends a transfer response 330 to the marketplace layer 110 (e.g., a confirmation). The acquisition service then sends a purchase response 332 from the marketplace layer 110 to the acquirer 304 (e.g., a further confirmation that the acquisition is successful).

Figure 4A:
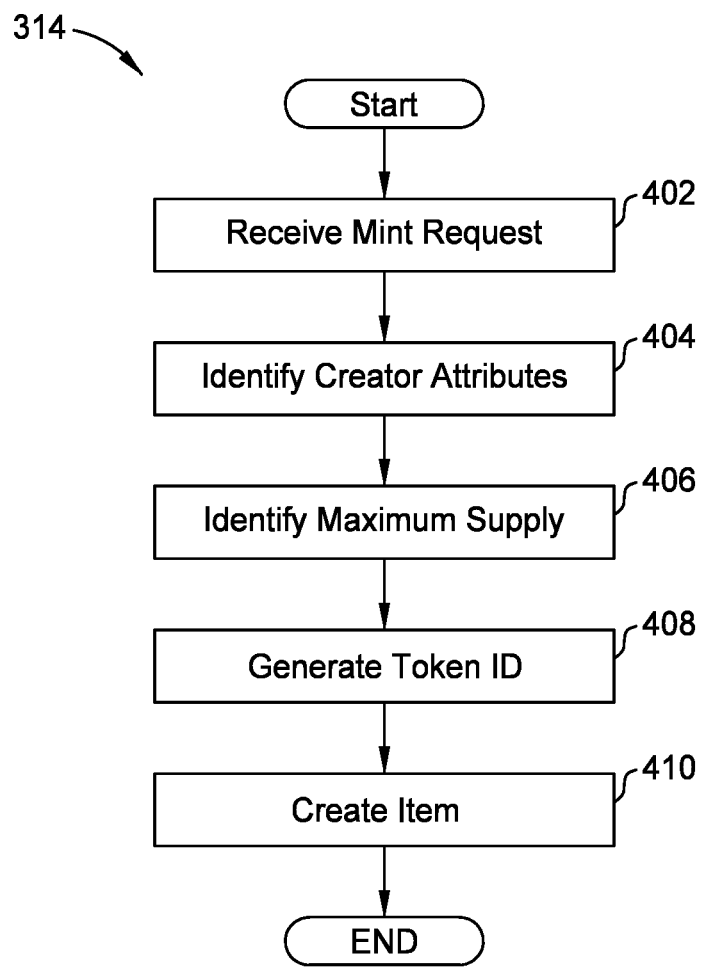
FIG. 4A is a flowchart illustrating a first technique for off-chain creation of items in a blockchain, according to one embodiment.

FIG. 4A is a flowchart illustrating a first technique for off-chain creation of items (e.g., NFTs) in a blockchain, according to one embodiment. In an embodiment, FIG. 4A corresponds with 314 illustrated in FIG. 3. At block 402 a minting service (e.g., the minting service 212 illustrated in FIG. 2) receives a mint request for an item (e.g., an NFT, a semi-fungible token, or any other suitable item). For example, as discussed above in relation to FIG. 3, a creator (e.g., the creator 302 illustrated in FIG. 3) can transmit a mint request to an NFT marketplace (e.g., the marketplace layer 110 illustrated in FIGS. 1 and 3). In an embodiment, the mint request can be made pursuant to a suitable smart contract. For example, the mint request can be made pursuant to an ERC 1155 contract for the Ethereum blockchain, and can be used to mint a suitable non-fungible, or semi-fungible, token. This is merely an example, and any suitable smart contract or block chain can be used.

At block 404, the minting service identifies creator attributes. In an embodiment, the mint request includes an identifier for the creator of the item (e.g., a wallet identifier for the creator, or any other suitable identifier). Alternatively, or in addition, the minting service can identify the creator attribute using a query to the creator, using information maintained at the NFT marketplace (e.g., at the marketplace layer 110 illustrated in FIGS. 1 and 3), using a query to a third party entity (e.g., an identification service), or using any other suitable techniques.

At block 406, the minting service identifies the maximum supply for the item. For example, the item can be an NFT with a maximum supply of 1. As another example, the item can be a semi-fungible token with a maximum supply greater than 1 (e.g., an item which may have a defined limit of copies greater than 1). In an embodiment, the mint request identifies the maximum supply. Alternatively, or in addition, the minting service can identify the maximum supply using a suitable query (e.g., to the creator or to a third party service), using information maintained at the NFT marketplace (e.g., a desired maximum supply for all items for a given creator maintained at the marketplace layer 110 illustrated in FIGS. 1 and 3), or using any other suitable techniques.

At block 408, the minting service generates a token ID for the item. In an embodiment, the tokenID is encoded to identify the creator and the maximum supply for the token. For example, a tokenID can be a defined length identifier (e.g., 255 bits). A portion of the tokenID (e.g., 160 of the 255 bits) can be used to encode an identifier for the creator wallet, the maximum supply, and any other suitable information. Thus, the tokenID, itself, can be used to identify the creator and the maximum supply for the token. As discussed below in relation to FIG. 4B, this facilitates off-chain creation by allowing an acquirer to validate a token, even before the token is added to the blockchain.

At block 410, the minting service creates the item. For example, a typical on-chain minting of an item generates a mint event that calls a minting function of a smart contract. The smart contract minting function typically transfers the token from a null address (e.g., a zero address) to the creator (e.g., to the creator's wallet).

In an embodiment, the minting service can instead generate a creation event at the marketplace layer (e.g., off-chain) reflecting the transfer of the token from a null address to the creator address, without recording the transfer on-chain. Instead of being recorded on chain in the smart contract, the minting service creates the token off-chain, with the tokenID generated at block 408, and maintains a record of the token and any other suitable information. For example, the token (or other data) can be recorded in an on-premises repository for the marketplace layer, in a cloud repository (e.g., a public cloud, a private cloud, a hybrid cloud, or any other suitable cloud repository), or in any other suitable repository. This allows the creation to be recorded off-chain, with a token identifying the creator and supply, without the computational burden of recording the minting on the blockchain and without requiring transactional fees (e.g., gas fees). Instead, as discussed further below in relation to FIG. 4B, the token can be recorded on the blockchain when it is first transferred from the creator to an acquirer.

Figure 4B:
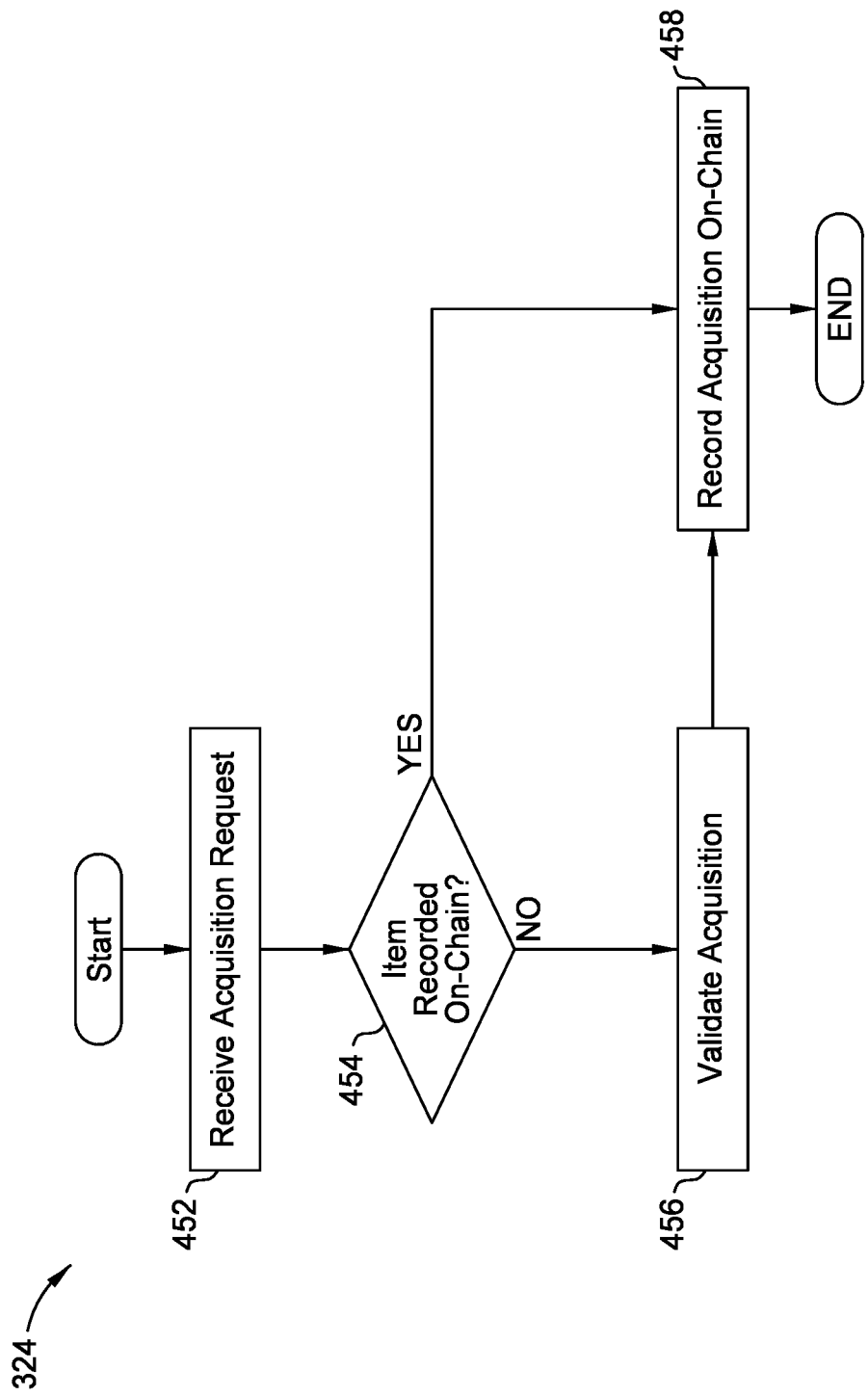
FIG. 4B is a flowchart illustrating acquiring an item created off-chain using a first technique, according to one embodiment

FIG. 4B is a flowchart illustrating acquiring an item (e.g., an NFT) created off-chain using a first technique, according to one embodiment. In an embodiment, FIG. 4B corresponds with 324 illustrated in FIG. 3. At block 452 an acquisition service (e.g., the acquisition service 214 illustrated in FIG. 2) receives an acquisition request. For example, as discussed above in relation to FIG. 3, an acquirer (e.g., the acquirer 304 illustrated in FIG. 3) can seek to purchase an NFT through an NFT marketplace and can send an acquisition request to a marketplace layer (e.g., the marketplace layer 110 illustrated in FIGS. 1 and 3).

At block 454, the acquisition service determines whether the item has been recorded on chain. As discussed above, if the item is newly created (e.g., has not been transferred from the creator to another acquirer) and was created off-chain (e.g., as illustrated in FIG. 4A, above), the item token is not yet recorded on-chain (e.g., the creation of the token is not yet recorded in a smart-contract stored on a blockchain). In an embodiment, the acquisition service determines whether the item is recorded on-chain by querying the associated smart contract (e.g., by querying the totalSupply for the ID to identify how many have been minted on-chain). For example, the acquisition request can include the tokenID, and the acquisition service can query the associated smart contract for that tokenID. If the smart contract does not include a record of the item (e.g., a record of the tokenID), then the item has not yet been recorded on-chain and the flow proceeds to block 456. Further, if the smart contract reflects fewer tokens recorded on the blockchain than is permitted by the maximum supply (e.g., as encoded in the tokenID), then the item has not yet been recorded on-chain. In both circumstances, the flow proceeds to block 456. In an embodiment, querying the smart contract is relatively computationally inexpensive (e.g., because it does not require modifying the blockchain) and does not require transaction fees (e.g., gas fees).

At block 456, the acquisition service validates the acquisition. In an embodiment, the tokenID itself includes encoded information identifying the creator of the token (e.g., the wallet of the creator) and the maximum supply for the token. This information can be used to validate the acquisition. For example, the acquisition service can validate that the creator of the item, as encoded in the tokenID, matches the transferor of the item. Assuming the acquisition service validates the acquisition, the flow proceeds to block 458.

At block 458, the acquisition service records the acquisition on-chain. For example, the acquisition service calls the appropriate smart contract function (e.g., an ERC 1155 function) to transfer the item from the creator to the acquirer. In an embodiment, if the token is created off-chain, the acquisition service first calls the smart contract to update the state of tokens held by the creator (e.g., to allow transfer of the token from the creator to the acquirer). This is merely an example, and any suitable technique can be used to record the acquisition on-chain.

Figure 5:
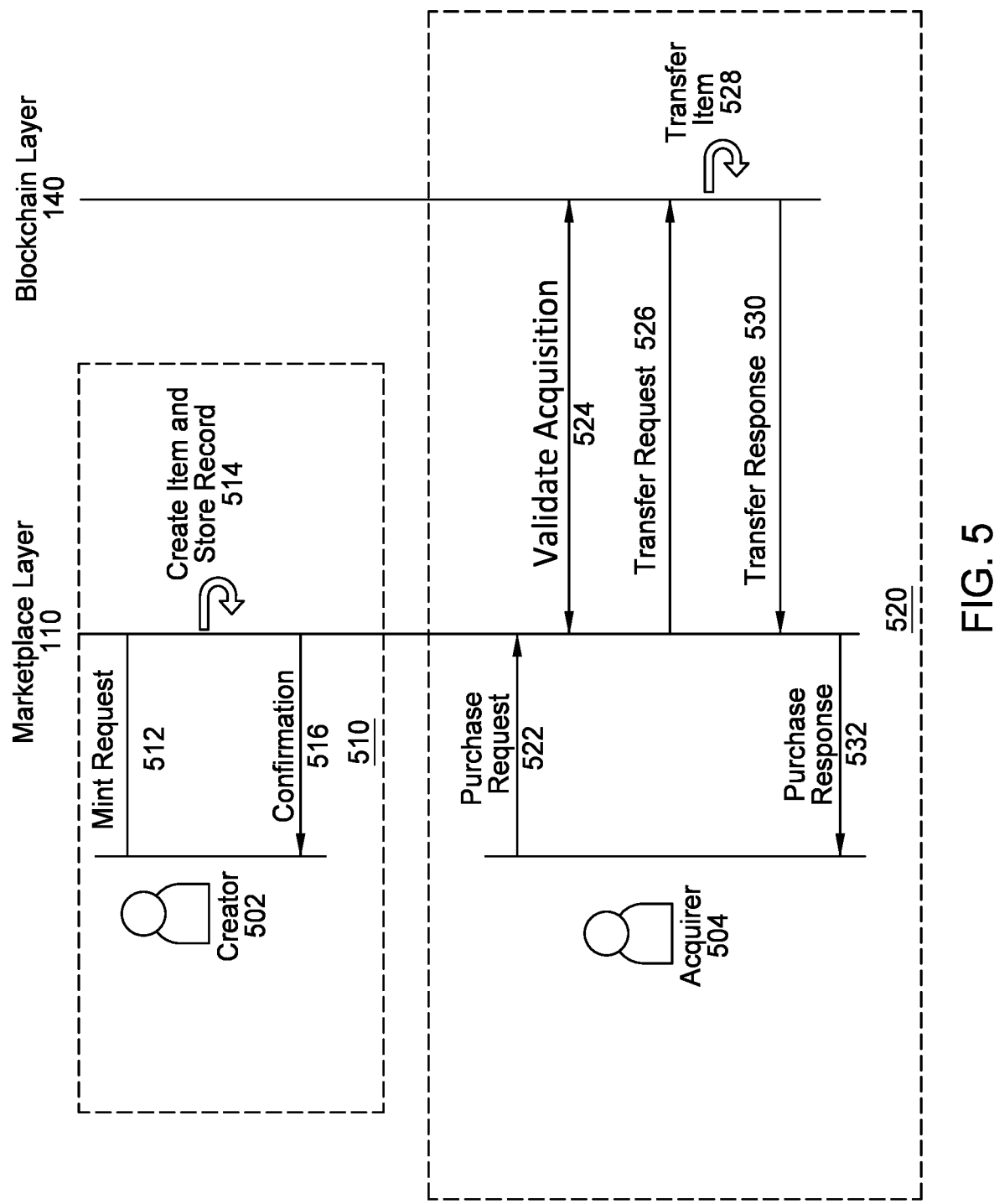
FIG. 5 illustrates a further technique for off-chain creation of items in a blockchain, according to one embodiment.
Figure 6A:
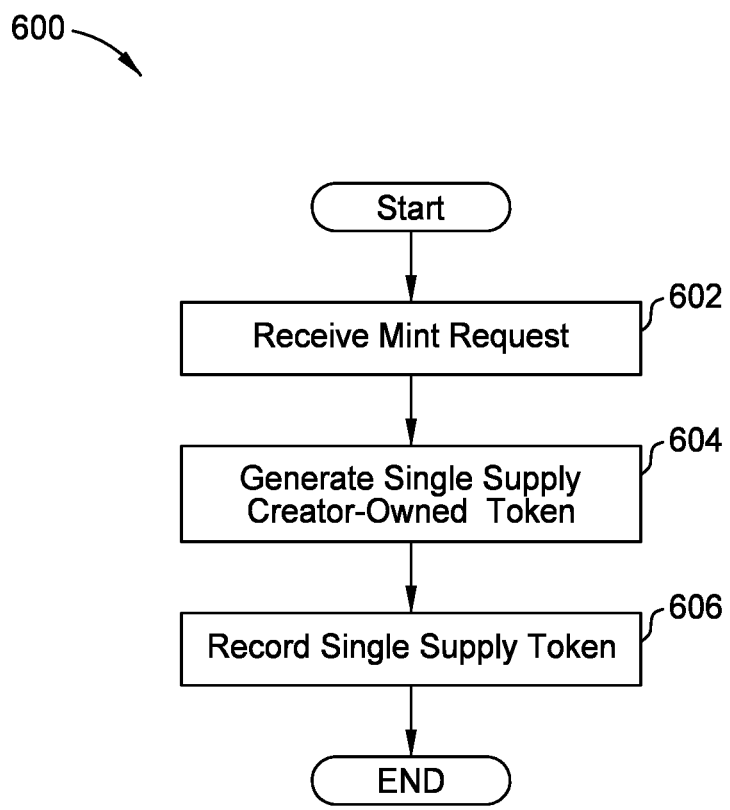
FIG. 6A is a flowchart illustrating a second technique for off-chain creation of items in a blockchain, according to one embodiment.
Figure 6B:
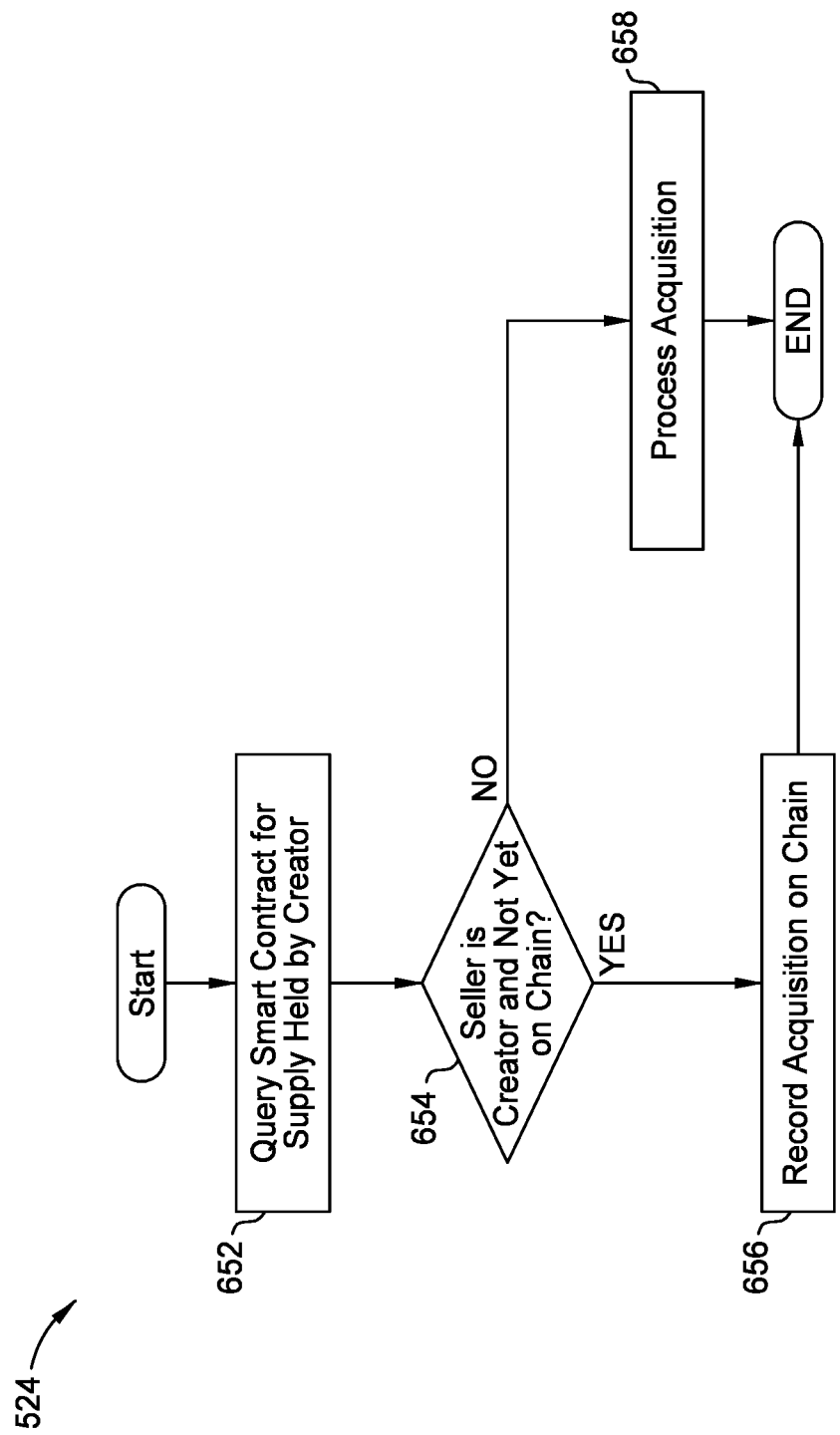
FIG. 6B is a flowchart illustrating acquiring an item created off-chain using a second technique, according to one embodiment.

FIG. 5 illustrates a further technique for off-chain creation of items (e.g., NFTs) in a blockchain, according to one embodiment. In an embodiment, as discussed above, FIGS. 3 and 4A-B illustrate off-chain creation techniques in which a creator identifier and maximum supply for a token are encoded into the tokenID. FIGS. 5 and 6A-B illustrate alternative, or additional, techniques in which a single supply smart contract is used for off-chain creation of items.

In an embodiment, a creator 502 creates an item as part of an off-chain creation process 510. The creator 502 sends a mint request 512 to a marketplace layer 110 (e.g., the marketplace layer 110 illustrated in FIG. 1). For example, the mint request 512 can identify a digital object for the item (e.g., an image file, a video file, a text file, an audio file, an object model file (e.g., a three-dimensional model of an object), or any other suitable digital object).

In an embodiment, the mint request 512 can include the digital object itself. Alternatively, or in addition, the mint request 512 can identify a storage location for the object (e.g., a suitable repository at which the object is stored). The mint request 512 can further include data describing the item (e.g., a name, description, description URL link, or any other suitable data), properties for the item (e.g., a collection for the item, properties of the item, levels or statistics for the item, or any other suitable properties), a supply for the item (e.g., a maximum supply), and a blockchain for the item. These are merely examples, and the mint request 512 can include any suitable combination of this data or any other suitable data.

At 514, a minting service (e.g., the minting service 212 illustrated in FIG. 2) creates an item and stores a record of the item (e.g., a record of an associated tokenID). As discussed above, in an embodiment an item (e.g., an NFT) can be created (e.g., a tokenID can be assigned to the item's metadata) without immediately storing the item on the blockchain (e.g., without immediately updating the state of an associated smart contract). For example, as discussed below in relation to FIG. 6A, an item can be created using a smart contract that limits the maximum supply of any given token to 1, and that requires a creator to own the token before the item is added to the blockchain.

In an embodiment, the minting service then sends a confirmation 516 to the creator 502. For example, the confirmation can confirm that the item was created successfully and can identify the created item (e.g., using a tokenID). These are merely examples, and the confirmation 516 can include any suitable information.

In an embodiment, the item is created off-chain using the marketplace layer 110. This is merely an example. One or more of these techniques can be used outside of an NFT marketplace. For example, a creator can directly create the item off chain with a suitable tokenID, or the item can be created in any other suitable environment.

In an embodiment, an acquirer 504 acquires an item using an acquisition process 520. For example, the acquirer can identify an item for sale using an NFT marketplace, and can use the item marketplace (e.g., using the marketplace layer 110) to acquire the item. In an embodiment, the acquirer 504 sends a purchase request 522 to the marketplace layer 110 (e.g., a request to purchase the item from the creator 502). For example, the purchase request 522 can identify an item that the acquirer 504 wishes to purchase, and can identify a wallet as a source for funds to purchase the item. These are merely examples, and the purchase request 522 can include any suitable information.

At 524, an acquisition service (e.g., the acquisition service 214 illustrated in FIG. 2) validates the acquisition. For example, the acquisition service can query the smart contract to ensure that the supply of the token associated with the creator of the token matches the supply to be acquired. This is discussed further below with regard to FIG. 6B.

Assuming the acquisition service successfully validates the acquisition, the acquisition service sends a transfer request 526 to a blockchain layer 140 (e.g., the blockchain layer 140 illustrated in FIG. 1). As discussed below with regard to FIG. 6B, in an embodiment the transfer request 526 requests a transfer from the creator 502 (e.g., the wallet of the creator 502) to the acquirer 504 (e.g., the wallet of the acquirer 504). For example, the acquisition service can call a suitable function in a smart contract to transfer the item from the creator to the acquirer.

At 528, the blockchain layer 140 transfers the item from the creator 502 (e.g., the wallet of the creator 502) to the acquirer 504 (e.g., the wallet of the acquirer 504). For example, the smart contract executes the desired function and transfers the item. The blockchain layer 140 can relate to any suitable blockchain, and can transfer the NFT using any suitable technique for the relevant blockchain. In an embodiment the blockchain layer 140 then sends a transfer response 530 to the marketplace layer 110 (e.g., a confirmation). The acquisition service then sends a purchase response 532 from the marketplace layer 110 to the acquirer 504 (e.g., a further confirmation that the acquisition is successful).

FIG. 6A is a flowchart 600 illustrating a second technique for off-chain creation of items (e.g., NFTs) in a blockchain, according to one embodiment. In an embodiment, FIG. 6A corresponds with 514 illustrated in FIG. 5. At block 602 a minting service (e.g., the minting service 212 illustrated in FIG. 2) receives a mint request for an item (e.g., an NFT, a semi-fungible token, or any other suitable item). For example, as discussed above in relation to FIG. 5, a creator (e.g., the creator 502 illustrated in FIG. 5) can transmit a mint request to an NFT marketplace (e.g., the marketplace layer 110 illustrated in FIGS. 1 and 3). In an embodiment, the mint request can be made pursuant to a suitable smart contract. For example, the mint request can be made pursuant to an ERC 1155 contract for the Ethereum blockchain, and can be used to mint a suitable non-fungible, or semi-fungible, token.

At block 604, the minting service generates a single supply creator-owned token. For example, the minting service can generate a token associated with a smart contract that guarantees each token is single supply (e.g., the maximum supply for each token is 1) and that guarantees that created tokens are initially owned by their creator. In an embodiment, the minting service accomplishes this by encoding both the creator's wallet address and the maximum supply into the token ID. Alternatively, or in addition, an incremental token ID can be used (e.g., without encoding the creator's wallet address and maximum supply).

At block 606, the minting service records the single supply token. For example, the minting service can record the token (or other data) in an on-premises repository for the marketplace layer, in a cloud repository (e.g., a public cloud, a private cloud, a hybrid cloud, or any other suitable cloud repository), or in any other suitable repository.

FIG. 6B is a flowchart illustrating acquiring an item (e.g., an NFT) created off-chain using a second technique, according to one embodiment. In an embodiment, FIG. 6B corresponds with 524 illustrated in FIG. 5. At block 652 an acquisition service (e.g., the acquisition service 214 illustrated in FIG. 2) queries a smart contract for a supply of a token held by a creator. For example, a purchase request (e.g., the purchase request 522 illustrated in FIG. 5) can identify the creator of an item and a tokenID for the item to be acquired. The acquisition service can use that information to query the smart contract.

At block 654, the acquisition service determines whether the seller is the creator and the whether supply for the item is already recorded on the blockchain. As discussed above in relation to block 604 illustrated in FIG. 6, in an embodiment the smart contract is guaranteed to generate only tokens with a supply of 1 that are initially owned by the creator. The acquisition service determines whether the seller of the item is the creator, and whether the smart contract has recorded any supply for the given tokenID on-chain. If the seller is the creator, and the smart contract has no supply for the item recorded on chain, then the item has not yet been minted and can be transferred from the creator to the acquirer. The flow proceeds to block 656.

At block 656 the acquisition service records the acquisition on chain. For example, the acquisition service calls the appropriate smart contract function (e.g., an ERC 1155 function) to transfer the item from the creator to the acquirer. In an embodiment, if the token is created off-chain, the acquisition service first calls the smart contract to update the state of tokens held by the creator (e.g., to allow transfer of the token from the creator to the acquirer). This is merely an example, and any suitable technique can be used to record the acquisition on-chain.

Returning to block 654, if the acquisition service determines that the seller is not the creator, or that supply has been recorded on-chain (e.g., as part of a prior on-chain minting), the flow proceeds to block 658. At block 658, the acquisition service processes the acquisition. In an embodiment, if the acquisition service determines that supply of the item has been recorded on-chain, the acquisition service uses typical techniques to transfer the item. For example, the acquisition service can call a smart contract function which verifies that the seller owns the item and that the acquirer has sufficient funds, and can transfer the item from the seller to the acquirer (if appropriate).

In an embodiment, if the acquisition service determines that supply of the item has not been recorded on chain, and the seller is not the creator, then the acquisition service cancels the transaction. For example, this can indicate that the item has been created off-chain (or not created at all), and that it is not owned by the seller.

Freezing Metadata

Figure 7:
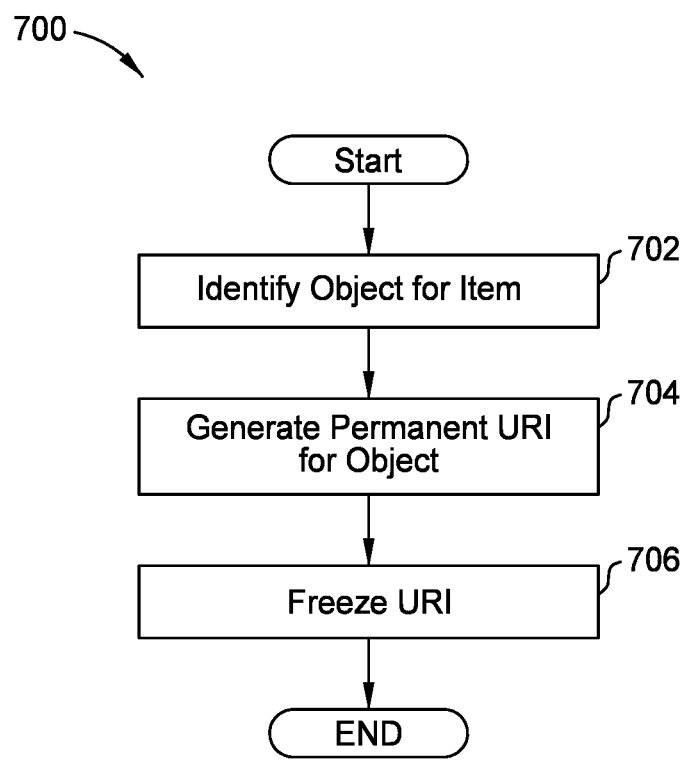
FIG. 7 is a flowchart illustrating freezing metadata for an item in an NFT marketplace, according to one embodiment.

FIG. 7 is a flowchart 700 illustrating freezing metadata for an item in an NFT marketplace, according to one embodiment. In an embodiment, for many items in existing systems the associated metadata (e.g., identifying the digital object associated with the item) is not frozen and could be changed. For example, a uniform resource indicator (URI) identifying the object may not be frozen in the metadata for the item. A malicious user can change the URI, after sale of the item, thus changing the associated digital object and potentially decreasing the value of the item and harming the purchaser. In an embodiment, this can be solved by freezing the URI. The frozen URI can be guaranteed not to change for the life of the item. Further, the frozen URI can be associated with a durable file system (e.g., the InterPlanetary File System (IPFS) or Arweave) to ensure that the digital object identified by the frozen URI does not change.

This is a significant technical improvement over prior techniques. For example, prior solutions provide URIs that can change over time, potentially causing errors and requiring owners of items to continually maintain or validate their items (e.g., continually check the URI to ensure that it is accurate and identifies the correct digital object). This maintenance and validation of the URI and the digital object creates wasted network traffic and wastes computationally resources. One or more techniques described herein freeze the URI, and ensure that the URI identifies an object stored in a durable file system. This eliminates the need to continually check the validity of the URI and the object it identifies, saving network and compute resources.

At block 702 a minting service (e.g., the minting service 212 illustrated in FIG. 2), identifies an object for the item. For example, as discussed above in relation to FIGS. 3 and 5, a mint request for an item (e.g., the mint requests 312 or 512 illustrated in FIGS. 3 and 5, respectively) can identify a digital object to associate with an item. The mint request can include the object itself, a URI identifying a location for the object, or any other information identifying the object.

At block 704, the minting service generates a permanent URI for the object. For example, the minting service can identify a location in a durable file system (e.g, IPFS or Arweave) to store the object. If the object is not yet stored in the durable file system, the minting service can add it to the durable file system and generate a URI. In an embodiment, the generated URI is tied to properties of the object itself (e.g., a hash value for the digital object) and so it permanently identifies the object.

At block 706, the minting service freezes the URI. In an embodiment, the minting service adds the permanent URI for the object to the meta data for the item. The minting service then freezes the URI (e.g., using a suitable smart contract) to ensure that the URI cannot be changed after the item is minted.

Migrating Contracts

Figure 8:
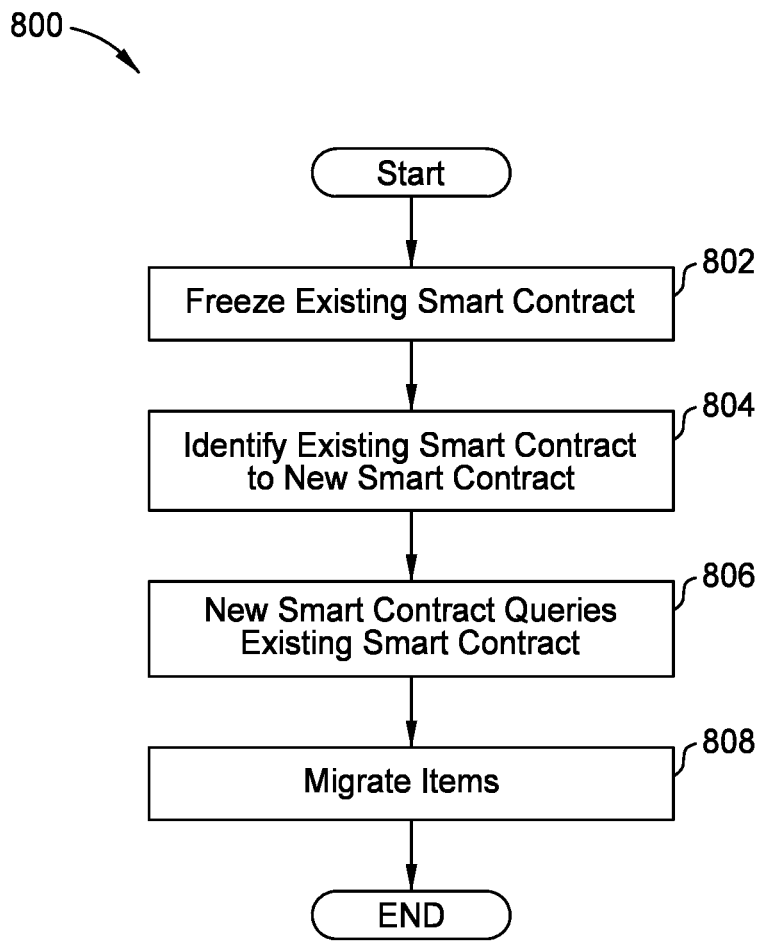
FIG. 8 is a flowchart illustrating migrating items across smart contracts, according to one embodiment.

FIG. 8 is a flowchart 800 illustrating migrating items across smart contracts, according to one embodiment. In an embodiment, items are typically generated using a particular associated smart contract (e.g., a software program stored on a blockchain). These smart contract software programs, however, are sometimes revised or improved (e.g., to fix bugs or improve the functioning of the program). Typically, migrating items generated using the old contract, to the newer contract, is a very challenging problem. It is typically done manually (e.g., by an administrator), and wastes significant computational and human resources.

One or more techniques described below allow for improved migration of items from an old smart contract to a new smart contract. For example, the new contract can query the old contract for items, and can automatically migrate items. This is a significant technical improvement over prior techniques. For example, prior techniques required manual, and piecemeal, identification of items from the old contract and migration of the items to the new contract. This wastes computational resources with unnecessary blockchain transactions, and is a significant burden on administrators. Further, it makes developing new contracts more expensive and difficult, potentially resulting in less development of new contracts, which can lead to more bugs and less efficient smart contracts.

At block 802 a contract migration service (e.g., the contract migration service 216 illustrated in FIG. 2) freezes the existing contract (e.g., does not allow completion of calls to functions of the existing smart contract). In an embodiment, migrating items between contracts takes time. Freezing the contract avoids transfers of items, or other item transactions, while the contracts are being migrated. This avoids errors resulting from item transactions while the items are being migrated from the existing smart contract to a new smart contract.

At block 804, the contract migration service identifies the existing smart contract to the new smart contract. For example, the contract migration service can provide the new smart contract with an address (or other identifier) identifying the existing contract. The new smart contract can contact the existing smart contract (e.g., call functions in the existing smart contract) using the identifier.

At block 806, the contract migration service has the new smart contract query the existing smart contract. For example, the new smart contract can query the existing smart contract for token balances, ownership information, etc. In an embodiment, the new smart contract can query the existing smart contract directly (e.g., by calling functions of the existing smart contract), or the contract migration service can facilitate the new smart contract querying the existing smart contract. These are merely examples, and the new smart contract can query the existing smart contract using any suitable technique.

At block 808, the contract migration service migrates items from the existing smart contract to the new smart contract. For example, the new smart contract can add the balance and ownership information from the existing smart contract to the new smart contract. In an embodiment, the new smart contract can do this directly, the contract migration service can facilitate migrating the items, or any other suitable technique can be used.

Additional Considerations

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a computer, a special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for minting a limited fungibility token using an off-chain storage repository that is not part of a blockchain, the method comprising:
   receiving a mint request associated with a digital item;
   minting the limited fungibility token relating to the digital item, comprising:
      generating a token identifier for the limited fungibility token by encoding information into a length of bits, the information being indicative of at least (i) a creator of the limited fungibility token and (ii) a supply of the limited fungibility token;
      associating the token identifier with the digital item by embedding the token identifier within metadata of the digital item;
      generating a uniform resource indicator (URI) for the digital item within a durable file system, wherein the URI comprises a hash value generated based at least in part on the metadata of the digital item to ensure the digital item associated with the URI does not change;
      storing the digital item in the durable file system; and
      recording the limited fungibility token in the off-chain storage repository of a computer system, wherein the URI is accessible using the limited fungibility token;
   receiving a request to transfer the limited fungibility token from a first entity to a second entity;
   validating the request to transfer the limited fungibility token at least in part by:
      querying a smart contract to determine that the limited fungibility token is not recorded on the blockchain, wherein the blockchain is stored as a distributed ledger across a plurality of computer systems; and
      querying the smart contract to determine that the first entity is the creator of the limited fungibility token based at least in part on the metadata of the digital item; and
   recording the digital item to the blockchain by calling a function of the smart contract to update a state of the limited fungibility token.

2. The method of claim 1, wherein the limited fungibility token comprises a non-fungible token (NFT) associated with the digital item.

3. The method of claim 1, wherein the smart contract enforces a maximum supply for the limited fungibility token.

4. The method of claim 1, wherein the mint request is received from the first entity, prior to minting the limited fungibility token, wherein the smart contract enforces ownership of the limited fungibility token by the first entity after minting and before recording the limited fungibility token in the blockchain.

5. The method of claim 1,
   wherein the token identifier for the limited fungibility token reflects a blockchain wallet address for the creator.

6. A system configured for minting a limited fungibility token using an off-chain storage repository that is not part of a blockchain, the system comprising:
   a processor; and
   a memory having instructions stored thereon which, when executed on the processor, performs operations comprising:
      receiving a mint request associated with a digital item;
      minting the limited fungibility token relating to the digital item, comprising:
         generating a token identifier for the limited fungibility token by encoding information into a length of bits, the information being indicative of at least (i) a creator of the limited fungibility token and (ii) a supply of the limited fungibility token;
         associating the token identifier with the digital item by embedding the token identifier within metadata of the digital item;
         generating a uniform resource indicator (URI) for the digital item within a durable file system, wherein the URI comprises a hash value generated based at least in part on the metadata of the digital item to ensure the digital item associated with the URI does not change;
         storing the digital item in the durable file system; and
         recording the limited fungibility token in the off-chain storage repository of a computer system, wherein the URI is accessible using the limited fungibility token;
      receiving a request to transfer the limited fungibility token from a first entity to a second entity;
      validating the request to transfer the limited fungibility token at least in part by:
         querying a smart contract to determine that the limited fungibility token is not recorded on the blockchain, wherein the blockchain is stored as a distributed ledger across a plurality of computer systems; and
         querying the smart contract to determine that the first entity is the creator of the limited fungibility token based at least in part on the metadata of the digital item; and
      recording the digital item to the blockchain by calling a function of the smart contract to update a state of the limited fungibility token.

7. The system of claim 6, wherein the smart contract enforces a maximum supply for the limited fungibility token.

8. A non-transitory computer-readable medium having instructions stored thereon which, when executed by a processor, performs operations for minting a limited fungibility token using an off-chain storage repository that is not part of a blockchain, the operations comprising:
   receiving a mint request associated with a digital item;
   minting the limited fungibility token relating to the digital item, comprising:
      generating a token identifier for the limited fungibility token by encoding information into a length of bits, the information being indicative of at least (i) a creator of the limited fungibility token and (ii) a supply of the limited fungibility token;
      associating the token identifier with the digital item by embedding the token identifier within metadata of the digital item;
      generating a uniform resource indicator (URI) for the digital item within a durable file system, wherein the URI comprises a hash value generated based at least in part on the metadata of the digital item to ensure the digital item associated with the URI does not change;
      storing the digital item in the durable file system; and
      recording the limited fungibility token in the off-chain storage repository of a computer system, wherein the URI is accessible using the limited fungibility token;
   receiving a request to transfer the limited fungibility token from a first entity to a second entity;
   validating the request to transfer the limited fungibility token at least in part by:

querying a smart contract to determine that the limited fungibility token is not recorded on the blockchain, wherein the blockchain is stored as a distributed ledger across a plurality of computer systems; and querying the smart contract to determine that the first entity is the creator of the limited fungibility token based at least in part on the metadata of the digital item; and recording the digital item to the blockchain by calling a function of the smart contract to update a state of the limited fungibility token.

9. The non-transitory computer-readable medium of claim 8, wherein the smart contract enforces a maximum supply for the limited fungibility token.

10. The method of claim 1, wherein recording the limited fungibility token to the blockchain comprises recording a transfer of ownership of the limited fungibility token from the first entity to the second entity, and wherein prior to recording the limited fungibility token, the limited fungibility token is not recorded in the blockchain.

11. The method of claim 10, wherein recording the limited fungibility token to the blockchain further comprises updating a state of the smart contract to reflect the transfer of ownership of the limited fungibility token from the first entity to the second entity.

12. The system of claim 6, wherein recording the limited fungibility token to the blockchain comprises recording a transfer of ownership of the limited fungibility token from the first entity to the second entity, and wherein prior to recording the limited fungibility token, the limited fungibility token is not recorded in the blockchain.

13. The system of claim 12, wherein recording the limited fungibility token to the blockchain further comprises updating a state of the smart contract to reflect the transfer of ownership of the limited fungibility token from the first entity to the second entity.

14. The non-transitory computer-readable medium of claim 8, wherein recording the limited fungibility token to the blockchain comprises recording a transfer of ownership of the limited fungibility token from the first entity to the second entity, and wherein prior to recording the limited fungibility token, the limited fungibility token is not recorded in the blockchain.

15. The non-transitory computer-readable medium of claim 14, wherein recording the limited fungibility token to the blockchain further comprises updating a state of the smart contract to reflect the transfer of ownership of the limited fungibility token from the first entity to the second entity.

* * * * *